ved

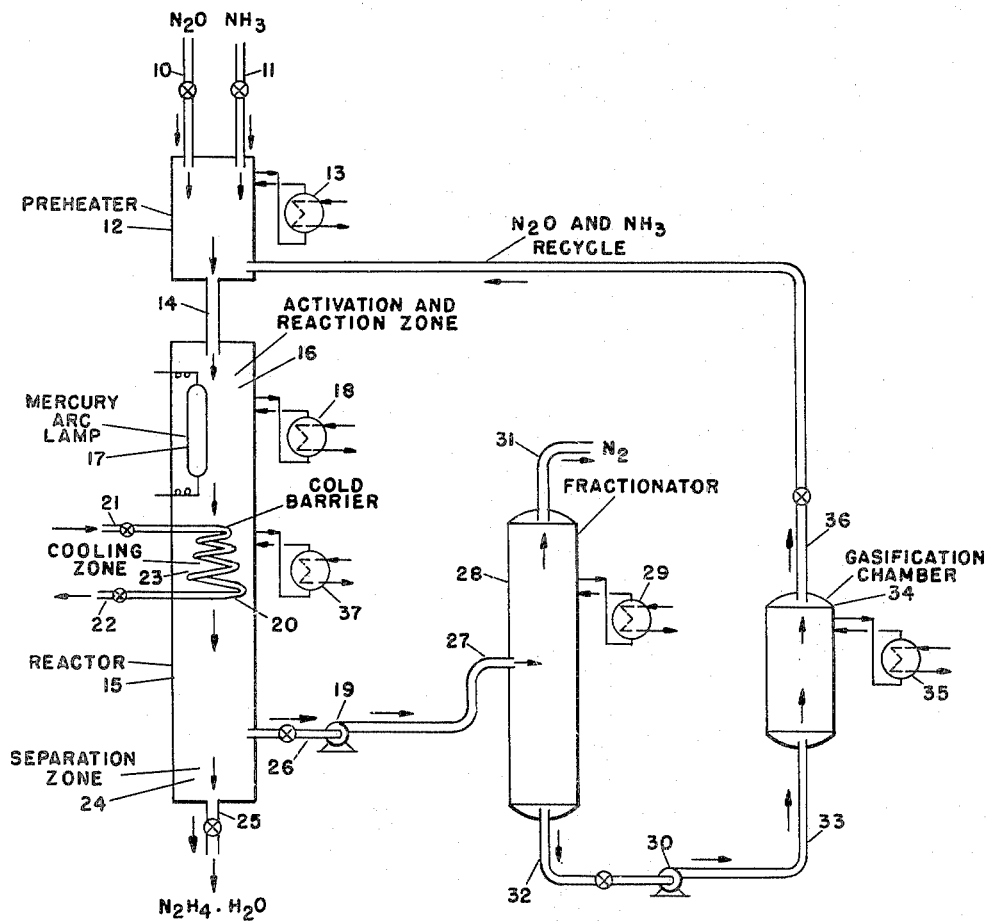

United States Patent Office 2,753,300
Patented July 3, 1956

2,753,300

MANUFACTURE OF HYDRAZINE

Russell M. Mantell, Newark, N. J., Otto J. Plescia, Madison, Wis., and Robert S. Pratt, Valley Stream, N. Y., assignors to The M. W. Kellogg Company, Jersey City, N. J., a corporation of Delaware Application January 12, 1951, Serial No. 205,652

12 Claims. (Cl. 204—157)

This invention relates to a process for the manufacture of hydrazine from nitrous oxide. One of the objects of the invention is to provide an improved process for the manufacture of hydrazine, wherein all reactants and by-products are lower-boiling than the hydrazine product produced. Another object of the invention is to provide an improved process for the manufacture of hydrazine from readily available materials. Other objects and advantages inherent in the invention will become apparent from the following description.

According to this invention, the manufacture of hydrazine is accomplished, generally, under the conditions more fully hereinafter disclosed, by first reacting in the vapor phase nitrous oxide with ammonia and/or hydrogen, in the presence of a photochemical agent, to produce a reaction product comprising hydrazine and water. This product is next subjected to rapid cooling or quenching, as more fully hereinafter disclosed, to reduce the degree of activation energy present to a level at which the hydrazine product is stable. The stabilized product is then subjected to further treatment in order to recover hydrazine as a product of the process, while unreacted reactants are separated from the remainder of the stabilized reaction product and are recycled to the initial reaction step.

The reaction between nitrous oxide and either ammonia or hydrogen, in the vapor phase, that is, with both reactants being present in a vapor state, may be represented as follows:

I. 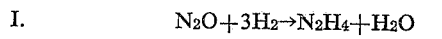 $N_2O + 3H_2 \rightarrow N_2H_4 + H_2O$

II.  $N_2O + 2NH_3 \rightarrow N_2H_4 + N_2 + H_2O$

From Equation I it will be noted that reaction between nitrous oxide and hydrogen produces a mixture of hydrazine and water in either the liquid or the vapor state, while from Equation II it will be noted that gaseous nitrogen is produced as an additional component of the resulting liquid or vaporized mixture. It should be noted, in this respect, that when nitrous oxide is reacted with mixtures of ammonia and hydrogen, as indicated above, the resulting product comprises nitrogen, water and hydrazine with all components of this product being obtained in either the liquid or the vapor phase. In each instance, nitrogen and any excess quantities of nitrous oxide, ammonia and hydrogen in the product of reaction are obtained in the vapor state; while hydrazine and water that are formed are obtained in the gaseous state when the reaction is carried out at relatively high temperatures, or in the liquid state when the reaction is carried out at relatively low temperatures, as more fully hereinafter described.

As indicated above, reaction in the vapor phase between nitrous oxide with either ammonia or hydrogen, or mixtures of ammonia and hydrogen, is effected in the presence of a photochemical agent. The presence of a photochemical agent as a source of ultra-violet radiation has been found necessary in order to insure proper activation of the components for reaction to take place. According to the theoretical aspects of the above synthesis of hydrazine, in order for reaction to take place, it is necessary that the entire reaction mixture be in an activated state. In order to obtain such activation it is not necessary that each of the reactants be directly activated by means of ultra-violet radiation, in order that the entire reaction mixture may be obtained in the desired activated state prior to reaction. The desired activation may also occur by means of an activated molecule of one gaseous reactant component imparting activation to an unactivated molecule of the other gaseous reactant component, as a result of molecular collisions. The term "molecular collision" denotes the contact or collision between an activated molecule of one gaseous reactant component and an unactivated molecule of the other gaseous reactant component or components.

In carrying out the reaction between the aforementioned reactants in the presence of a photochemical agent, such photochemical activation media may be employed as ultra-violet radiation produced by electrical energy (for example, lamps capable of producing ultra-violet light), or direct sunlight, or other sources of actinic light capable of producing ultra-violet radiation.

The reaction temperature should be high enough to cause the reaction to proceed at a satisfactory rate, but should not reach the point at which thermal activation of the nitrous oxide causes it to become active as an oxidizing agent to the extent where the rate of production of hydrazine is reduced. The reaction proceeds at about —20° C., but a temperature of at least about 15° C., is necessary to cause the reaction to proceed at a practical rate. As the reaction temperature is raised further, the activity of the nitrous oxide as an oxidizing agent becomes increasingly felt in the oxidation of hydrazine, so that above about 50° C., the increased rate of oxidation of hydrazine more than off-sets any increased reaction rate resulting from temperature increase. Consequently, the preferred range of reaction temperatures is in the range of about 15° C. to about 50° C. The optimum reaction temperature is at about atmospheric temperature (25° C.). Temperatures above 50° C. may be used, but the net production of hydrazine is decreased as the temperature is raised to the point of practical disappearance at about 200° C. Therefore, the possible operating range is about —20° C. to about 200° C. although the preferred range is between about 15° C. and about 50° C. It should also be noted that it may be desirable to preheat the reactant gases prior to their introduction into the reaction zone, wherein they are brought to the desired reaction temperature prior to activation.

The reactants are employed in ratios which are varied in accordance with the temperature conditions selected. It may be desired to operate the process under conditions of low activation to minimize the conversion of nitrous oxide to unwanted products. Under such conditions of low activation, it may be desirable to supply the nitrous oxide and the other reactant, viz., ammonia and/or hydrogen, in a ratio of nitrous oxide to ammonia and/or hydrogen lower than the stoichiometric ratios indicated by the above equations. As the proportion of the hydrogen or ammonia in the reaction is decreased, the rate of reaction approaches the point of disappearance, but the reaction proceeds at a satisfactory rate under these conditions when supplying the reactants in mol ratios between about 1:1 and the stoichiometric ratios. The degree of activation depends upon the activation supplied by the photochemical agent. The activation results from temperature increase and the activating effect of pressure. The effect of pressure is noticed principally at low temperatures when employing hydrogen to react with the nitrous oxide. Consequently, ratios of nitrous oxide to the other reactant between about 1:1 and the stoichiometric ratio are employed principally at temperatures of about —20° C. and about 15° C. and at subatmospheric pressures.

As the temperature is increased, the thermal activation of the nitrous oxide is intensified with consequent oxidation of the hydrazine product. To minimize the oxidation of the hydrazine product, it is desirable to supply the hydrogen or ammonia to the reaction zone in amounts in excess of the stoichiometric requirements of the reaction. At about 15° C. the stoichiometric ratios may be satisfactory, but as the temperature is increased it is desirable to increase the excess of the hydrogen or ammonia supplied to the reaction zone, so that at the maximum operating temperature indicated above, the ratio of nitrous oxide to ammonia or hydrogen may be as low as 1:18. Within the preferred temperature range of 15–50° C. a mol ratio of nitrous oxide to ammonia of about 1:12, has been employed with satisfactory results. However, in commercial practice, the effect of the excess hydrogen or ammonia in greatly enlarging the reaction space needed, must be taken into account in the economics of the process. Therefore, for operations within the preferred temperature range, mol ratios of nitrous oxide to ammonia between the stoichiometric range and about 1:5 are preferred and mol ratios of nitrous oxide to hydrogen may be employed between the stoichiometric ratio and 1:7.

When operating within the preferred temperature range of about 15° C. and about 50° C., it is desirable to maintain a pressure in the reaction zone between about 15 pounds per square inch absolute and about 30 pounds per square inch absolute, although pressures between about 5 pounds per square inch absolute and about 100 pounds per square inch absolute may also be employed.

As previously indicated, the formed product from the aforementioned vapor phase reaction of nitrous oxide with ammonia and/or hydrogen, is obtained either as a liquid or vapor and comprises liquid or gaseous hydrazine and water, and may also comprise nitrogen and excesses of gaseous nitrous oxide, ammonia and hydrogen. This product is next subjected to rapid cooling or quenching, as previously indicated, in order to reduce the degree of activation energy present to a level at which the hydrazine is stable. Such reduction in the degree of activation energy of the product formed, is found necessary to avoid subsequent oxidation of hydrazine to nitrous oxide and water, or reduction of hydrazine to ammonia. The removal of the activation energy from the product thus formed will prevent destruction of the formed hydrazine molecule. For this purpose the hydrazine product, comprising reacted and unreacted gases or liquids, is brought into rapid contact with a suitable cold barrier to remove the residual activation energy from the formed product. This cold barrier may comprise any suitable cooling surface, such as a refrigerating coil, cold plate, or a liquid (such as liquid ammonia), and should have a surface temperature below about —40° C.

As indicated above, the formed hydrazine reaction product is subjected to rapid positive cooling by being brought into contact with the aforementioned cold barrier or cooling surface. In this cooling or condensation zone, the concentration of hydrazine is maintained such that the partial pressure of hydrazine is less than its vapor pressure at the prevailing temperature. To accomplish such rapid cooling or quenching, it has been found that the formed product must be brought into contact with the cold barrier within a time interval of less than about 0.1 seconds following the formation of the hydrazine product. This may be accomplished by placing the cold barrier, or a chamber in which the cold barrier is positioned, at such a point near the lower portion of the reaction zone, that the velocity of the components in the system is such that the time interval of travel between the lower-most point of the reaction zone and the upper-most surface of the cold barrier is less than about 0.1 seconds. Following the aforementioned rapid cooling or quenching action by contact with the cold barrier, the resulting product comprises hydrazine in the form of its hydrate (i. e., $N_2H_4 \cdot H_2O$) and also contains nitrogen and any unreacted reactants, namely, nitrous oxide, ammonia and/or hydrogen. Hydrazine hydrate, being heavier than the other products thus formed, may be withdrawn from the cooling or quenching zone; while the remaining products are withdrawn in order to prevent subsequent dilution of the reaction in the continuous process, and are subjected to purification treatment for reuse in the hydrazine-producing system.

In order to purify the remaining products of reaction, after the aforementioned removal of the hydrazine hydrate product from the cooling zone, so that the nitrous oxide together with ammonia and/or hydrogen reactants may be reused in the system, the hydrazine-free product of reaction is next withdrawn from the cooling or quenching zone and passed to a suitable low temperature fractionation zone. In this fractionation zone the gaseous products are compressed to a point at which nitrous oxide and ammonia are liquefied, while nitrogen and hydrogen (if present) are removed as overhead gases. Hydrogen may be separated from nitrogen by conventional means and thus recovered for reuse; while the liquefied nitrous oxide and ammonia thus separated, may be gasified and also returned to the system for reuse; or if so desired, a portion of the vented gaseous products may be compressed, cooled to about —40° C. and returned to the cooling zone to act as a liquid cold barrier which may be withdrawn with the formed hydrazine product; or serve as a refrigerant by being circulated through the aforementioned refrigerating coil.

For a fuller understanding of the process of the present invention, reference is had to the accompanying drawing which illustrates, diagrammatically, an elevational view of one form of the apparatus employed and capable of carrying out an embodiment of the process of the invention. It should be noted, however, that it is not intended that the invention be limited to the embodiment as illustrated, but is capable of other embodiments which may extend beyond the scope of the apparatus shown. Some of the mechanical elements necessary to effect the transfer of liquids and vapors and to maintain the conditions of temperature and pressure necessary to carry out the function of the apparatus, have been omitted in order to simplify the description.

Referring to the drawing, gaseous nitrous oxide and ammonia are introduced under pressurized flow through valved-lines 10 and 11, respectively, into a preheating chamber represented by preheater 12. The flow of these reactant gases into preheater 12 is so regulated that the quantities present are in accordance with the aforementioned mol ratio requirements. In preheater 12 these gases are preheated to the desired temperature within the aforementioned temperature ranges, by suitable heating means represented by heat exchanger 13. The resulting mixture of preheated nitrous oxide and ammonia is then transferred through line 14 into a reactor 15. Reactor 15 is shown in a vertical position in the drawing, but may also be in a horizontal position if desired. This reactor is a cyclindrical steel vessel, approximately 4 feet long, 1 foot in diameter and has a wall thickness of about ¼ inch. In reactor 15 the down-flowing mixture of reactant gases enters an activation and reaction zone 16 in an upper portion of the reactor. Zone 16 is provided with a suitable means for producing ultra-violet radiation, such as a mercury arc lamp 17. In zone 16, proper temperature conditions within the aforementioned temperature range are maintained by suitable heating means, represented by heat exchanger 18. The required pressure conditions in zone 16, within the aforementioned pressure ranges, are maintained by means of pump 19. As a result of the vapor phase activation and reaction of nitrous oxide and ammonia in zone 16, there is obtained a reaction product comprising hydrazine, water, nitrogen and usually some excess of unreacted quantities of nitrous oxide and ammonia. This product passes from zone 16, flows down the reactor and comes into contact with a suitable cold barrier, such as refrigerating coil 20. Coil 20 is preferably in a spiral form, and is positioned in reactor 15 so that the upper-most portion of the coil is preferably not more than a few inches below the lower-most portion of activation and reaction zone 16. Such positioning of the coil insures the cooling of the aforementioned reaction product within a time interval of less than about 0.1 second following the formation of the product. Coil 20 is preferably supplied with a suitable circulating refrigerant which is introduced through valved-line 21 and emerges through valved-line 22. The area in reactor 15, in which coil 20 is positioned, is represented by cooling zone 23. Coil 20 is maintained at surface temperature below about −40° C., to obtain a product comprising hydrazine hydrate, gaseous nitrogen, nitrous oxide and ammonia. This product flows down reactor 15 to the lower-most portion of the reactor, represented by separation zone 24. In separation zone 24, the liquid hydrazine hydrate product is withdrawn and recovered through valved-line 25, while gaseous nitrogen, nitrous oxide and ammonia are removed through valved-line 26, by means of the pumping action of pump 19.

The gaseous mixture of nitrogen, nitrous oxide and ammonia is next transferred through line 27, from line 26, to a suitable fractionation zone, represented by fractionator 28. In this fractionation vessel, the gaseous mixture is heated by suitable heating means, represented by heat exchanger 29, and compressed by means of the pumping action of pump 30, so that gaseous nitrogen is recovered overhead through line 31. Nitrous oxide and ammonia are liquefied and withdrawn through valved-line 32. This liquefied mixture of nitrous oxide and ammonia is next transferred by means of pumping action of pump 30 from line 32, through line 33 into a gasification chamber 34. In gasification chamber 34, the liquid mixture of nitrous oxide and ammonia is heated to the gaseous or vapor state by suitable heating means represented by heat exchanger 35. Following gasification in chamber 34, a gaseous mixture of nitrous oxide and ammonia is withdrawn through valved-line 36 and transferred through this line into preheater 12 for further reuse in the process. It should be noted that while the reactants employed in conjunction with the present illustrated apparatus are gaseous nitrous oxide and gaseous ammonia, the same apparatus may also be employed to produce hydrazine from gaseous nitrous oxide and gaseous hydrogen or gaseous nitrous oxide and mixture of gaseous ammonia and gaseous hydrogen.

The following example will serve to illustrate, but is not intended in any way to limit the process of the present invention.

*Example 1*

A gaseous mixture of ammonia and nitrous oxide in a mol ratio of about 12:1 was passed through a clear quartz tube approximately ⅛ inch inside diameter by 30 inches in length, (the quartz tube being formed in the shape of a flat spiral) at a rate of about 3250 cc./min. The gases were led into the quartz tube at atmospheric pressure and room temperature. The quartz tube was illuminated by a mercury arc lamp as a source of ultra-violet radiation, and the temperature of the reaction zone was raised to about 50° C. during the reaction.

The gaseous products formed were passed directly into 100 cc. liquid ammonia, where liquid hydrazine hydrate was condensed. Unreacted nitrous oxide was vented. The ammonia was evaporated at the end of the run. The liquid product (residue) collected gave positive tests for hydrazine using p-dimethylaminobenzaldehyde as the test reagent.

An 11 hour run yielded 0.5–0.7 cc. of liquid hydrazine hydrate, and an 18 hour run gave 1.3–1.6 cc. of hydrazine hydrate.

In the absence of ultra-violet light under these conditions, no hydrazine could be detected.

We claim:

1. A process for the manufacture of hydrazine which comprises: reacting in the vapor phase nitrous oxide and a compound selected from the group consisting of ammonia and hydrogen, under irradiation by actinic light, in a mol ratio of nitrous oxide to ammonia between about 1:2 and about 1:12 when ammonia is employed and in a mol ratio of nitrous oxide to hydrogen between about 1:3 and about 1:7 when hydrogen is employed, said reaction being effected at a temperature between about 15° C. and about 200° C. and at a pressure between about 5 pounds per square inch absolute and about 100 pounds per square inch absolute, to form a product comprising hydrazine; positively cooling said product to a temperature below about −40° C. within a time interval of less than about 0.1 second following the formation of said product; and separating hydrazine from said cooled product.

2. A process for the manufacture of hydrazine which comprises: reacting in the vapor phase nitrous oxide and a compound selected from the group consisting of ammonia and hydrogen, under irradiation by actinic light, in a mol ratio of nitrous oxide to ammonia between about 1:2 and about 1:12 when ammonia is employed and in a mol ratio of nitrous oxide to hydrogen between about 1:3 and about 1:7 when hydrogen is employed, said reaction being effected at a temperature between about 15° C. and about 50° C. and at a pressure between about 5 pounds per square inch absolute and about 100 pounds per square inch absolute, to form a product comprising hydrazine; positively cooling said product to a temperature below about −40° C. within a time interval of less than about 0.1 second following the formation of said product; and separating hydrazine from said cooled product.

3. A process for the manufacture of hydrazine which comprises: reacting in the vapor phase nitrous oxide and a compound selected from the group consisting of ammonia and hydrogen, under irradiation by actinic light, in a mol ratio of nitrous oxide to ammonia between about 1:2 and about 1:12 when ammonia is employed and in a mol ratio of nitrous oxide to hydrogen between about 1:3 and about 1:7 when hydrogen is employed, said reaction being effected at a temperature between about 15° C. and about 200° C. and at a pressure between about 15 pounds per square inch absolute and about 30 pounds per square inch absolute, to form a product comprising hydrazine; positively cooling said product to a temperature below about −40° C. within a time interval of less than about 0.1 second following the formation of said product; and separating hydrazine from said cooled product.

4. A process for the manufacture of hydrazine which comprises: reacting in the vapor phase nitrous oxide and ammonia, under irradiation by actinic light, in a mol ratio between about 1:2 and about 1:12, said reaction being effected at a temperature between about 15° C. and about 200° C. and at a pressure between about 5 pounds per square inch absolute and about 100 pounds per square inch absolute, to form a product comprising hydrazine; positively cooling said product to a temperature below about −40° C. within a time interval of less than about 0.1 second following the formation of said product; and separating hydrazine from said cooled product.

5. A process for the manufacture of hydrazine which comprises: reacting in the vapor phase nitrous oxide and ammonia, under irradiation by actinic light, in a mol ratio between about 1:2 and about 1:5, said reaction being effected at a temperature between about 15° C. and about 200° C. and at a pressure between about 5 pounds per square inch absolute and about 100 pounds per square inch absolute, to form a product comprising hydrazine; positively cooling said product to a temperature below about −40° C. within a time interval of less than about 0.1 second following the formation of said product; and separating hydrazine from said cooled product.

6. A process for the manufacture of hydrazine which comprises: reacting in the vapor phase nitrous oxide and hydrogen, under irradiation by actinic light, in a mol ratio between about 1:3 and about 1:7, said reaction being effected at a temperature between about 15° C. and about 200° C. and at a pressure between about 5 pounds per square inch absolute and about 100 pounds per square inch absolute, to form a product comprising hydrazine; positively cooling said product to a temperature below about −40° C. within a time interval of less than about 0.1 second following the formation of said product; and separating hydrazine from said cooled product.

7. A process for the manufacture of hydrazine which comprises: reacting in the vapor phase nitrous oxide and ammonia, under irradiation by actinic light, in a mol ratio between about 1:2 and about 1:12, said reaction being effected at a temperature between about 15° C. and about 50° C. and at a pressure between about 15 pounds per square inch absolute and about 30 pounds per square inch absolute, to form a product comprising hydrazine; positively cooling said product to a temperature below about −40° C. within a time interval of less than about 0.1 second following the formation of said product; and separating hydrazine from said cooled product.

8. A process for the manufacture of hydrazine which comprises: reacting in the vapor phase nitrous oxide and ammonia, under irradiation by actinic light, in a mol ratio between about 1:2 and about 1:5, said reaction being effected at a temperature between about 15° C. and about 50° C. and at a pressure between about 15 pounds per square inch absolute and about 30 pounds per square inch absolute, to form a product comprising hydrazine; positively cooling said product to a temperature below about −40° C. within a time interval of less than about 0.1 second following the formation of said product; and separating hydrazine from said cooled product.

9. A process for the manufacture of hydrazine which comprises: reacting in the vapor phase nitrous oxide and hydrogen, under irradiation by actinic light, in a mol ratio between about 1:3 and about 1:7, said reaction being effected at a temperature between about 15° C. and about 50° C. and at a pressure between about 15 pounds per square inch absolute and about 30 pounds per square inch absolute, to form a product comprising hydrazine; positively cooling said product to a temperature below about −40° C. within a time interval of less than about 0.1 second following the formation of said product; and separating hydrazine from said cooled product.

10. A process for the manufacture of hydrazine which comprises: reacting in the vapor phase nitrous oxide and ammonia, under irradiation by actinic light, in a mol ratio between about 1:2 and about 1:12, said reaction being effected at a temperature between about 15° C. and about 50° C. and at a pressure between about 15 pounds per square inch absolute and about 30 pounds per square inch absolute, to form a product comprising hydrazine; positively cooling said product to a temperature below about −40° C. within a time interval of less than about 0.1 second following the formation of said product to form a product comprising hydrazine hydrate and unreacted reactants; separating hydrazine hydrate from said last-mentioned product; separating unreacted reactants from the remainder of said last-mentioned product; and recycling said unreacted reactants to said first-mentioned reaction step.

11. A process for the manufacture of hydrazine which comprises: reacting in the vapor phase nitrous oxide and ammonia, under irradiation by actinic light, in a mol ratio between about 1:2 and about 1:5, said reaction being effected at a temperature between about 15° C. and about 50° C. and at a pressure between about 15 pounds per square inch absolute and about 30 pounds per square inch absolute, to form a product comprising hydrazine; positively cooling said product to a temperature below about −40° C. within a time interval of less than about 0.1 second following the formation of said product to form a product comprising hydrazine hydrate and unreacted reactants; separating hydrazine hydrate from said last-mentioned product; separating unreacted reactants from the remainder of said last-mentioned product; and recycling said unreacted reactants to said first-mentioned reaction step.

12. A process for the manufacture of hydrazine which comprises: reacting in the vapor phase nitrous oxide and hydrogen, under irradiation by actinic light, in a mol ratio between about 1:3 and about 1:7, said reaction being effected at a temperature between about 15° C. and about 50° C. and at a pressure between about 15 pounds per square inch absolute and about 30 pounds per square inch absolute, to form a product comprising hydrazine; positively cooling said product to a temperature below about −40° C. within a time interval of less than about 0.1 second following the formation of said product to form a product comprising hydrazine hydrate and unreacted reactants; separating hydrazine hydrate from said last-mentioned product; separating unreacted reactants from the remainder of said last-mentioned product; and recycling said unreacted reactants to said first-mentioned reaction step.

References Cited in the file of this patent

UNITED STATES PATENTS

| | | |
|---|---|---|
| 974,741 | Blackmore | Nov. 1, 1910 |
| 1,079,705 | Hlavati | Nov. 25, 1913 |
| 2,134,206 | Roberts | Oct. 25, 1938 |
| 2,697,026 | Mantell et al. | Dec. 14, 1954 |

OTHER REFERENCES

Ellis et al.: Chemical Action of Ultraviolet Rays (1941), pp. 317–323.

Gedye et al.: Journal Chemical Society (1932), pages 1160–69.

Audrieth et al.: Chemistry of Hydrazine, 1951, pages 14–15, 22–23.